(12) United States Patent
Heiskanen et al.

(10) Patent No.: US 11,084,261 B2
(45) Date of Patent: Aug. 10, 2021

(54) OXYGEN BARRIER FILM AND LAMINATE AND METHODS OF MANUFACTURING THE SAME

(71) Applicant: Stora Enso OYJ, Helsinki (FI)

(72) Inventors: Isto Heiskanen, Imatra (FI); Esa Saukkonen, Lappeenranta (FI); Ville Ribu, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 136 days.

(21) Appl. No.: 16/087,207

(22) PCT Filed: Mar. 20, 2017

(86) PCT No.: PCT/IB2017/051597
§ 371 (c)(1),
(2) Date: Sep. 21, 2018

(87) PCT Pub. No.: WO2017/163167
PCT Pub. Date: Sep. 28, 2017

(65) Prior Publication Data
US 2019/0091982 A1    Mar. 28, 2019

(30) Foreign Application Priority Data
Mar. 22, 2016  (SE) .................... 1650380-7

(51) Int. Cl.
| | | |
|---|---|---|
| *B32B 29/00* | (2006.01) | |
| *B32B 27/32* | (2006.01) | |
| *B32B 27/08* | (2006.01) | |
| *B32B 5/02* | (2006.01) | |
| *B32B 7/12* | (2006.01) | |
| *B32B 29/08* | (2006.01) | |
| *B32B 27/12* | (2006.01) | |
| *B32B 27/34* | (2006.01) | |
| *B32B 27/10* | (2006.01) | |
| *B32B 37/15* | (2006.01) | |
| *D21H 11/18* | (2006.01) | |
| *D21H 21/16* | (2006.01) | |
| *C08J 5/18* | (2006.01) | |
| *B65D 65/40* | (2006.01) | |
| *B29C 48/21* | (2019.01) | |
| *B29C 48/22* | (2019.01) | |
| *B29C 48/08* | (2019.01) | |

(Continued)

(52) U.S. Cl.
CPC ........ *B32B 27/322* (2013.01); *B29C 48/0021* (2019.02); *B29C 48/08* (2019.02); *B29C 48/154* (2019.02); *B29C 48/21* (2019.02); *B32B 5/02* (2013.01); *B32B 7/12* (2013.01); *B32B 27/08* (2013.01); *B32B 27/10* (2013.01); *B32B 27/12* (2013.01); *B32B 27/304* (2013.01); *B32B 27/306* (2013.01); *B32B 27/32* (2013.01); *B32B 27/34* (2013.01); *B32B 29/00* (2013.01); *B32B 29/002* (2013.01); *B32B 29/08* (2013.01); *D21H 11/18* (2013.01); *D21H 21/16* (2013.01); *B29K 2023/00* (2013.01); *B29K 2023/06* (2013.01); *B29K 2023/12* (2013.01); *B29K 2995/0067* (2013.01); *B32B 2250/04* (2013.01); *B32B 2250/05* (2013.01); *B32B 2262/065* (2013.01); *B32B 2262/067* (2013.01); *B32B 2307/31* (2013.01); *B32B 2307/704* (2013.01); *B32B 2307/718* (2013.01); *B32B 2307/7244* (2013.01); *B32B 2317/12* (2013.01); *B32B 2317/18* (2013.01); *B32B 2327/06* (2013.01); *B32B 2329/04* (2013.01); *B32B 2377/00* (2013.01); *B32B 2439/62* (2013.01); *B32B 2439/70* (2013.01); *B32B 2553/00* (2013.01)

(58) Field of Classification Search
None
See application file for complete search history.

(56) References Cited

U.S. PATENT DOCUMENTS

| | | | |
|---|---|---|---|
| 6,495,223 | B1 | 12/2002 | Berlin |
| 2009/0324861 | A1 | 12/2009 | Penttinen et al. |

(Continued)

FOREIGN PATENT DOCUMENTS

| | | |
|---|---|---|
| CN | 102686399 A | 9/2012 |
| EP | 2554589 | 2/2013 |

(Continued)

OTHER PUBLICATIONS

International Searching Authority, Written Opinion of the International Searching Authority, PCT/IB2017/051597, dated May 16, 2017.
International Searching Authority, International Search Report, PCT/IB2017/051597, dated May 16, 2017.
Chinga-Carrasco, G., "Cellulose Fibres, Nanofibrils and Microfibrils: The Morphological Sequence of MFC Components from a Plant Physiology and Fibre Technology Point of View," Nanoscale Research Letters 2011.
Fengel, D., "Ultrastructural Behavior of Cell Wall Polysaccharides," Tappi J., Mar. 1970, vol. 53, No. 3.

*Primary Examiner* — Sheeba Ahmed
(74) *Attorney, Agent, or Firm* — Greer, Burns & Crain, Ltd.

(57) ABSTRACT

The invention concerns a fibrous-based oxygen barrier film, which comprises (i) a microfibrillated cellulose (MFC) film, (ii) an oxygen barrier polymer layer, (iii) an optional tie layer, and (iv) an outermost polyolefin layer. The invention even concerns a laminate, in which said multilayer film is combined with a fibrous paper or board base by means of an intermediate polyethylene layer. The oxygen barrier polymerlayer, which preferably is EVOH, and the polyolefin layer are brought by coextrusion onto the MFC film. The film and the laminate according to the invention aim at an improved oxygen barrier in high humidity conditions and have use in oxygen-sensitive food packaging.

18 Claims, No Drawings

(51) Int. Cl.
    *B32B 27/30*     (2006.01)
    *B29C 48/00*     (2019.01)
    *B29C 48/154*    (2019.01)
    *B29K 23/00*     (2006.01)

(56)         References Cited

U.S. PATENT DOCUMENTS

2012/0251818 A1* 10/2012 Axrup .................... B32B 27/10
                                                        428/326
2013/0004687 A1   1/2013 Oomori et al.

FOREIGN PATENT DOCUMENTS

| JP | 2012011651 A | 1/2012 |
| JP | 2012076305 A | 4/2012 |
| JP | 2015003428 A | 1/2015 |
| SE | 1351552 | 11/2014 |
| WO | 2011078770 | 6/2011 |
| WO | 2015034426 | 3/2015 |
| WO | 2017072124 | 5/2017 |

\* cited by examiner

OXYGEN BARRIER FILM AND LAMINATE AND METHODS OF MANUFACTURING THE SAME

This application is a U.S. National Phase under 35 U.S.C. § 371 of International Application No. PCT/IB2017/051597, filed Mar. 20, 2017, which claims priority under 35 U.S.C. §§ 119 and 365 to Swedish Application No. 1650380-7, filed Mar. 22, 2016.

The present invention relates to a fibrous-based oxygen barrier film and a laminate comprising such film. The invention even covers methods of manufacturing the film and the laminate, as well as uses of the film or the laminate.

BACKGROUND OF THE INVENTION

There are specific polymers, which have conventionally been used for providing an oxygen barrier that is a layer of material which to a high degree is impermeable to oxygen. Ethyl vinyl alcohol copolymer (EVOH), polyamide (PA), polyvinyl alcohol copolymer (PVOH) and polyvinyl chloride (PVC) are examples of such polymers.

An effective oxygen barrier is required in packaging industry for shielding products that are oxygen-sensitive, thereby extending their shelf-life. These include many food products in particular. Known packaging materials with oxygen barrier properties may be comprised of a polymer film or of a fibrous paper or board coated with a layer of an oxygen barrier polymer, usually as part of a multilayer coating structure.

More recently microfibrillated cellulose (MFC) films, in which fibrils are bonded to one another through hydrogen bonds, have been proposed for use as gas barriers. The publication EP 2 554 589 A1 describes preparation of such films, in which an aqueous cellulose nanofibre dispersion is coated on a paper or polymeric substrate, dried and finally peeled off as a nanofibre film sheet. Embodiments taught for improving the gas barrier film include addition of an inorganic compound for improving the water vapour impermeability in humid conditions, as well as adding a thermoplastic polymer (e.g. LDPE) layer to lend heat-sealability.

WO 2015/034426 A1 describes MFC film as an oxygen barrier polymer film for food or liquid packaging purposes. The MFC film is fabricated by vacuum filtration of a fibrillated cellulose suspension, followed by drying. The publication teaches cross-linking of the cellulose in order to reduce affinity of the film to water and humidity. The packaging material may comprise the MFC film combined with a base material, which can be paper or paperboard. An EVOH, PA, PET, LDPE or HDPE layer may be added as a water vapour barrier film, either as an outermost layer or as sandwiched between the base material and the MFC film layer.

WO 2011/078770 A1 describes fibre-based packaging materials comprising a paper or paperboard substrate, a MFC layer, and an outermost polymer layer preferably of PE or PET. The MFC layer is preferably added to the substrate by wet coating, and the polymer layer is brought onto the MFC layer by lamination or extrusion coating. Optionally an EVOH layer may be included as sandwiched between the MFC and outermost polymer layers. The combination of MFC and polymer is said to lend the material barrier properties such as resistance against oxygen and vapour.

SE 1351552 A1 describes a multilayer packaging material especially for autoclave packages, which comprises a fibrous paper or board base, a MFC layer dispersion coated onto the fibrous base, and one or more inner polymer layers towards the inside of the package. Another polymer coating layer is provided on the reverse side of the fibrous base. The polymer layers are purposed to provide a liquid barrier that is required for autoclaving, and the MFC layer is purposed to replace previously used aluminum as an oxygen barrier. A PA or EVOH layer may be added as another oxygen barrier layer.

The gas barrier lent by a MFC film is based on the non-porous plasticized character of the film. However, this gas barrier is destroyed in high humidity conditions. Even EVOH as an oxygen barrier material is sensitive to humidity and apt to lose the barrier property. An outer vapour barrier PE layer added to shield the MFC or EVOH oxygen barrier layers fails to provide full compensation.

Another aspect of MCF films is that to achieve a superior oxygen barrier with an oxygen transmission rate (OTR) below 50 ml/m$^2$, or preferably below 15 ml/m$^2$, in 24 h at 50% relative humidity (RH) (ASTM standard D3985-05) the film must be manufactured at low production speeds, which is costly. Low-cost films produced at high speeds may have OTRs in the range of 100 to 8000 ml/m$^2$ or even more. The state of the art has considered such films to be useless as oxygen barriers.

SUMMARY OF THE INVENTION

There is thus room for a new MFC film based solution improving the oxygen barrier particularly in highly humid conditions, such as a hot tropical climate. According to the invention a novel fibrous-based oxygen barrier film comprises (i) a microfibrillated cellulose (MFC) film, (ii) an oxygen barrier polymer layer, (iii) an optional tie layer, and (iv) an outermost polyolefin layer, the oxygen barrier polymer and polyolefin layers (ii, iv) having been brought by coextrusion onto the MFC film (i).

The oxygen barrier polymer of the layer (ii) may be selected from a group consisting of ethyl vinyl alcohol copolymer (EVOH), polyamide (PA), polyvinyl alcohol copolymer (PVOH) and polyvinyl chloride (PVC). Of these polymers EVOH is particularly preferred.

The inventors have surprisingly found that when EVOH is brought by extrusion into direct contact with a premade MFC film the oxygen barrier is improved and, against expectations even withstands humidity without marked deterioration. Furthermore, this happens independently of an outer PE vapour barrier as used in the prior art. Without being bound to a theory, it is assumed that the improvement is due to crystallization along the boundary surface between MFC film and EVOH, where extruded melted EVOH snugly follows the minutest unevenness of the MFC film. Furthermore, the crystallised oxygen barrier is formed regardless of the OTR value of the MFC film, which enables use of low-quality film in oxygen-tight, moisture-insensitive packages. Also, it has been found that the film according to the present invention has reduced tendency to curl.

The outermost polyolefin layer required in the invention is necessary for supporting the EVOH layer in coextrusion. Preferably the polyolefin is polyethylene (PE), such as low-density polyethylene (LDPE), which lends the multilayer film superior heat-sealability. As known, PE is a water vapour barrier also, even if the invention is not particularly relying on this property.

The optional tie layer for adhering the polyolefin layer to the oxygen barrier polymer (e.g. EVOH) layer may be of an ethylene copolymer. Such tie polymers are well-known in the art.

Preferably the MFC film is a premade MFC film a weight of 20 to 40 g/m². Manufacture of such films useful in the invention is well-known from the prior art.

For the purposes of the invention it is generally sufficient that the MFC film layer as such has an OTR in 24 h at 23° C. and 50% RH in the range of 100 to 8000 ml/m², preferably 500 to 2000 ml/m². By means of the invention the final multilayer film will have an OTR dramatically lower than those quite modest figures.

There may be an extruded polyolefin layer also on the reverse side of the MFC film. Heat-sealable polyethylene such as LDPE is preferred for the purpose.

The products according to the invention so far described are flexible films particularly useful as packaging films for oxygen-sensitive products. Another embodiment of the invention is a laminate, which includes such film as part of its multilayer structure. Generally the laminate according to the invention comprises (i) a fibrous paper or board base, (ii) a polyethylene (PE) layer, (iii) a microfibrillated cellulose (MFC) film, (iv) an oxygen barrier polymer layer, (v) an optional tie layer, and (vi) an outermost polyolefin layer.

The descriptions of the film product above apply to layers (ii) to (vi) of the laminate according to the invention. Thus the oxygen barrier polymer layer (iv) is preferably an EVOH layer and the outermost polyolefin layer (vi) is preferably a PE layer, particularly LDPE layer. The PE layer (ii) on the reverse side of the MFC film (iii) forms a seal between the MFC film layer (iii) and the paper or board base (i).

For heat-sealability of the laminate the reverse side of the fibrous paper or board base may be provided with a heat-sealable polyolefin layer.

If the outermost polyolefin layers are of polypropylene (PP) instead of PE the film and the laminate according to the invention would even stand autoclaving in a high temperature up to about 130° C. and high vapour pressure.

The fibrous base may comprise paperboard of a weight of 130 to 250 g/m², preferably of 200 to 250 g/m², or alternatively the fibrous base may comprise paper of a weight of 40 to 130 g/m².

The invention even covers a method of manufacturing the film product as described above, the method being characterized in that an oxygen barrier polymer layer, an eventual tie layer and a polyolefin layer are coextruded onto a MFC film. A method according to the invention for manufacturing the laminate as described above is characterized in that the film product is dry-laminated to a paper or board base coated with a PE layer. This PE coating layer is to form the bond with the MFC film layer.

Finally the invention covers use of the film as described above or the laminate as described above for sealed food packages subject to high humidity conditions. Particularly such use concerns dry food packages, in which food is protected against oxygen as well as humidity.

DETAILED DESCRIPTION

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides, Tappi J.*, March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregrates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 200 m²/g, or more preferably 50-200 m²/g when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size or NFC.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated.

MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CMF) defining a cellulose nanofiber material containing multiple elementary fibrils with both crystalline and amorphous regions, having a high aspect ratio with width of 5-30 nm and aspect ratio usually greater than 50.

To practice the invention the MFC film (nanopaper) is preferably made at a paper machine adapted for film production from a MFC suspension of 0.1 to 1.0 wt-% consistency (for MFC, excluding eventual solid additives such as fillers) and 100 nm to 200 μm, preferably 100 nm to 10 μm, fibre length of the microfibrils (as indicated by a Schopper-Riegler drainability number of at least 70 SR, preferably at least 90 SR). The machine speed may be 100 m/min, preferably 300 m/min or even more. With such speeds the web is quickly dewatered and dried, and a large-scale production can be achieved economically. The weight of the MFC film would be about 20 to 40 $g/m^2$. The film has an OTR in 24 h at 23° C. and 50% RH in the range of 100 to 8000 $ml/m^2$, preferably 500 to 2000 $ml/m^2$. For an oxygen barrier these transmission rates are not remarkable as such, but the cost of producing such "second rate" MFC film is low.

Alternatively the MFC film could be prepared by casting an aqueous MFC suspension of a consistency of 5 to 25 wt-% onto a polymeric substrate to form a coating film, followed by drying and finally separating the film by peeling if off from the substrate.

The next step is coextrusion of an oxygen barrier polymer layer and a polyolefin layer onto the dried MFC film. Preferably the oxygen barrier polymer is EVOH and the polyolefin is heat-sealable LDPE. LDPE has a role in supporting the EVOH layer in the coextrusion. In order to better adhere LDPE to EVOH a tie layer of an ethylene copolymer may be included as a middle layer in the coextrusion. Suitable extruded polymer layer weights are 3 to 30 $g/m^2$ of EVOH, 0.5 to 15 $g/m^2$ of the tie polymer, and 10 to 50 $g/m^2$ of LDPE. A heat-sealable layer of 10 to 40 $g/m^2$ of LDPE may be extruded onto the reverse side of the MFC film layer.

In the coextrusion process the EVOH layer adapts itself to the tiniest irregularities of the MFC film surface, achieving a snug fit which is believed to produce a unitary crystallised layer forming an oxygen barrier greatly superior to that achieved by the MFC film and EVOH layers separately, and well above the mere sum of the two.

The multilayer film as described above is as such useful for packaging oxygen-sensitive foods, which are stored and marketed in high humidity conditions.

The alternative embodiment of the invention, namely a laminate incorporating a MFC film layer, may be based on a fibrous paper, paperboard or cardboard made of chemical or wood pulp. Preferably the fibrous base is paperboard of a weight of 130 to 250 $g/m^2$, preferably of 200 to 250 $g/m^2$, or paper of a weight of 40 to 130 $g/m^2$. At a first step the fibrous base is extrusion coated with a 10 to 20 $g/m^2$ layer of polyethylene, preferably LDPE. The second step then is dry or extrusion lamination of the MFC film based multilayer film as described above to the PE coated fibrous base, which includes adhering an uncoated or LDPE coated reverse side of the MFC film to the PE coat of the fibrous base. A heat sealable LDPE layer may be added by extrusion onto the reverse side of the fibrous base. The laminate is useful e.g. for heat-sealable carton or box packages of dry foods such as coffee, tea, chocolate, biscuits etc., which must be shielded against oxygen and high humidity.

EXAMPLE

A first multilayer laminate was prepared with a structure (i) an LDPE layer of 15 $g/m^2$, (ii) a paper layer of 70 $g/m^2$ ("Lumiflex 70"), (iii) an LDPE layer of 12 $g/m^2$, (iv) a MFC film layer of 30 $g/m^2$, (v) an EVOH layer of 6 $g/m^2$, (vi) an ethylene copolymer tie layer of 5 $g/m^2$, and (vii) an LDPE layer of 45 $g/m^2$.

A second multilayer laminate was prepared, which corresponded to the first multilayer laminate as described above, except that for (ii) a paperboard layer of 200 $g/m^2$ replaced the "Lumiflex 70" paper layer.

Results from measurements of oxygen and water vapour transmission rates at different temperatures and relative humidities are presented in Table 1. As the temperature of 23° C. and RH of 50% represent normal room circumstances, the temperature of 38° C. and RH of 85% are typical for tropical high humidity circumstances that are challenging to packaging industry and that the invention is specifically aimed at dealing with.

The measured low OTRs thus stem from paper and board based laminates according to the invention. However, results not markedly inferior to these would be expected from films lacking the fibrous paper or board base, as the surplus PE and base layers comprised in the laminates do not substantially contribute to the oxygen barrier, which is predominantly dependent on the MFC/EVOH interface structure.

TABLE 1

| | O2tr 23° C./50% RH 30 min measurement | | O2tr 23° C./50% RH 1 h measurement | |
|---|---|---|---|---|
| SuperBarr Paper (PE/Lumiflex70/PE/MFC/EVOH/tie/PE) | <5 | <5 | 2.4 | 2.6 |
| SuperBarr Board (PE/board/PE/MFC/EVOH/tie/PE) | 749 | 6.8 | ~2 | ~2 |

| | O2tr 38° C./85% RH | |
|---|---|---|
| SuperBarr Paper (PE/Lumiflex70/PE/MFC/EVOH/tie/PE) | 23 | 21 |
| SuperBarr Board (PE/board/PE/MFC/EVOH/tie/PE) | ~20 | ~15 |

| | WVTR 23° C./50% RH | |
|---|---|---|
| SuperBarr Paper (PE/Lumiflex70/PE/MFC/EVOH/tie/PE) | 2.4 | 2.3 |
| SuperBarr Board (PE/board/PE/MFC/EVOH/tie/PE) | 2.5 | 2.3 |

| | WVTR 38° C./85% RH | |
|---|---|---|
| SuperBarr Paper (PE/Lumiflex70/PE/MFC/EVOH/tie/PE) | 9.2 | 9.6 |
| SuperBarr Board (PE/board/PE/MFC/EVOH/tie/PE) | 7.7 | 8.1 |

The invention claimed is:
1. A fibrous-based oxygen barrier film, which comprises:
   i. a premade microfibrillated cellulose (MFC) film having a weight of 20 to 40 $g/m^2$, and an oxygen transmission rate (OTR) above 50 $ml/m^2$, at 50% relative humidity,
   ii. a co-extruded oxygen barrier polymer layer in direct contact with the MFC film, wherein the oxygen barrier polymer is selected from a group consisting of ethyl vinyl alcohol copolymer (EVOH), polyamide (PA), polyvinyl alcohol copolymer (PVOH) and polyvinyl chloride (PVC),
   iii. an optional co-extruded tie layer, and
   iv. a co-extruded outermost polyolefin layer.

2. The film of claim 1, wherein said oxygen barrier polymer is EVOH.

3. The film of claim 1, wherein said polyolefin is polyethylene (PE).

4. The film of claim 1, wherein there is an extruded polyolefin layer on the reverse side of the MFC film.

5. A laminate comprising comprising:
   i. a fibrous paper or board base,
   ii. a polyethylene (PE) layer,
   iii. a premade microfibrillated cellulose (MFC) film having a weight of 20 to 40 g/m$^2$, and an oxygen transmission rate (OTR) above 50 ml/m$^2$, at 50% relative humidity,
   iv. a co-extruded oxygen barrier polymer layer in direct contact with the MFC film, wherein said oxygen barrier polymer is selected from a group consisting of ethyl vinyl alcohol copolymer (EVOH), polyamide (PA), polyvinyl alcohol copolymer (PVOH) and polyvinyl chloride (PVC),
   v. an optional co-extruded tie layer, and
   vi. a co-extruded outermost polyolefin layer.

6. The laminate of claim 5, wherein the reverse side of the fibrous paper or board base is provided with a heat-sealable polyolefin layer.

7. The laminate of claim 5, wherein the fibrous base (i) comprises paperboard of a weight of 130 to 250 g/m$^2$.

8. The laminate of claim 5, wherein the fibrous base (i) comprises paper of a weight of 40 to 130 g/m$^2$.

9. A method for manufacturing a fibrous-based oxygen barrier film comprising co-extruding an oxygen barrier polymer layer, an optional tie layer, and a polyolefin layer onto a premade MFC film having a weight of 20 to 40 g/m$^2$, and an oxygen transmission rate (OTR) above 50 ml/m$^2$, at 50% relative humidity, wherein the oxygen barrier polymer layer is in direct contact with the MFC film, and wherein the oxygen barrier polymer is selected from a group consisting of ethyl vinyl alcohol copolymer (EVOH), polyamide (PA), polyvinyl alcohol copolymer (PVOH) and polyvinyl chloride (PVC).

10. The method of claim 9, wherein the oxygen barrier polymer is EVOH, and the polyolefin is a polyethylene or polypropylene.

11. The method of claim 9 further comprising dry-laminating the fibrous-based oxygen barrier film to a paper or board base coated with a PE layer.

12. The film of claim 1, wherein the MFC film has an oxygen transmission rate (OTR) in the range of 100 to 8000 ml/m$^2$ (ASTM D 3985-05), at 50% relative humidity.

13. The laminate of claim 5, wherein the fibrous base (i) comprises paperboard of a weight of 200 to 250 g/m$^2$.

14. The film of claim 1, wherein the oxygen barrier film has an OTR below 50 ml/m$^2$, in 24 h at 50% relative humidity (RH).

15. The film of claim 1, wherein the oxygen barrier film has an OTR below 15 ml/m$^2$, in 24 h at 50% relative humidity (RH).

16. The laminate of claim 5, wherein the laminate has an OTR below 50 ml/m$^2$, in 24 h at 50% relative humidity (RH).

17. The laminate of claim 5, wherein the laminate has an OTR below 15 ml/m$^2$, in 24 h at 50% relative humidity (RH).

18. The method of claim 9, wherein the oxygen barrier film has an OTR below 50 ml/m$^2$, in 24 h at 50% relative humidity (RH).

* * * * *